United States Patent [19]

Duprez

[11] 4,452,213

[45] Jun. 5, 1984

[54] DIESEL FUEL CONTROL VALVE AND SYSTEM

[76] Inventor: Wayne R. Duprez, Standard-Thomson Corporation, 152 Grove St., Waltham, Mass. 02154

[21] Appl. No.: 303,486

[22] Filed: Sep. 18, 1981

Related U.S. Application Data

[63] Continuation of Ser. No. 57,398, Jul. 13, 1979, abandoned.

[51] Int. Cl.³ ...................... F02M 37/20; B01D 53/22
[52] U.S. Cl. ................................... 123/516; 123/514; 123/557
[58] Field of Search ............... 123/516, 514, 557, 518, 123/445; 137/192, 193

[56] References Cited

U.S. PATENT DOCUMENTS

| | | | |
|---|---|---|---|
| 1,909,390 | 5/1933 | Ball et al. ............................ | 123/516 |
| 2,599,699 | 6/1952 | Dilworth ............................. | 123/516 |
| 3,472,214 | 10/1969 | Moon ................................. | 123/557 |
| 3,768,454 | 10/1973 | Markland ........................... | 123/557 |
| 4,205,643 | 6/1980 | Vidal ................................. | 123/514 |
| 4,279,232 | 7/1981 | Schuster ............................. | 123/516 |

Primary Examiner—Charles J. Myhre
Assistant Examiner—Carl Stuart Miller

[57] ABSTRACT

Fuel control mechanism, particularly adapted for control of diesel fuel flow to a diesel engine. The fuel control mechanism includes a housing provided with a plurality of flow passages therethrough. The fuel control mechanism includes a thermally responsive valve member which controls flow of fuel from a source thereof to the diesel engine and which controls the mixing of fuel from a source thereof with unused fuel which flows from the diesel engine. The fuel control mechanism also includes a valve member which controls flow of gas which flows from the diesel engine with the unused fuel.

6 Claims, 2 Drawing Figures

DIESEL FUEL CONTROL VALVE AND SYSTEM

RELATED APPLICATION

This application is a continuation of Application Ser. No. 057,398, filed July 13, 1979 now abandoned.

BACKGROUND OF THE INVENTION

In most diesel engine systems there is a filter device through which fuel must flow to reach the engine. When the engine apparatus is subjected to temperatures in the region of zero degrees Fahrenheit and lower, there is a tendency for ice crystals and wax to form in the diesel fuel. Such conditions cause clogging of the fuel filter device.

Another problem which exists in a conventional diesel engine apparatus relates to the fact that some of the fuel pumped to the engine is not used and the excess fuel which flows from the engine contains a small quantity of gas which is ordinarily vented from the fuel in the fuel tank as the excess fuel returns to the fuel tank.

Various methods have been employed in an attempt to overcome these problems. For example, the conventional No. 2 diesel fuel oil is mixed with No. 1 fuel oil. This has not been found to be satisfactory and adds to the expense of the fuel. U.S. Pat. Nos. 2,881,828 and 3,472,214 show the use of heat exchanger devices to heat the fuel. However, such devices may not provide heat to the fuel until a significant period of time has elapsed, and therefore fuel filter clogging may occur with initial operation.

U.S. Pat. No. 3,768,454 shows the use of a fuel tank which has a mixing zone with a temperature responsive valve controlling flow of fuel with respect to the mixing zone. Such a system requires a special fuel tank.

It is therefore an object of this invention to provide a diesel fuel control valve and system which provides fuel to a diesel engine at a proper temperature when the diesel engine apparatus is exposed to substantially any outdoor temperature, either cold or warm.

It is another object of this invention to provide such a diesel fuel control valve and system which does not require a special fuel tank.

It is another object of this invention to provide such a diesel engine fuel control valve and system which does not employ a heat exchanger device.

It is another object of this invention to provide such a diesel fuel control valve and system which can be easily and readily installed in an existing diesel engine apparatus.

It is another object of this invention to provide such a diesel engine control valve and system which is relatively small in physical size.

It is another object of this invention to provide such a diesel engine control valve and system by which gas is automatically removed from the liquid fuel.

Other objects and advantages of the diesel fuel control valve and system of this invention reside in the construction and arrangement of parts, the combination thereof, the method of manufacture, and the mode of operation, as will become more apparent from the following description.

BRIEF SUMMARY OF THE INVENTION

This invention comprises a diesel engine fuel control device for use in a diesel system which has a diesel engine provided with a fuel tank and fuel injector means, fuel conduit means for providing fuel to the fuel injector means, and fuel return means for conducting unused fuel from the diesel engine. The fuel control device includes thermally responsive fuel control valve means which controls the mixing of fuel which flows from the diesel engine with fuel flowing from the fuel tank. The fuel control device also includes valve means for venting gas which flows from the diesel engine with the unused fuel so that the gas is not mixed with fuel which flows to the diesel engine.

DETAILED DESCRIPTION OF THE INVENTION

Figure 1:
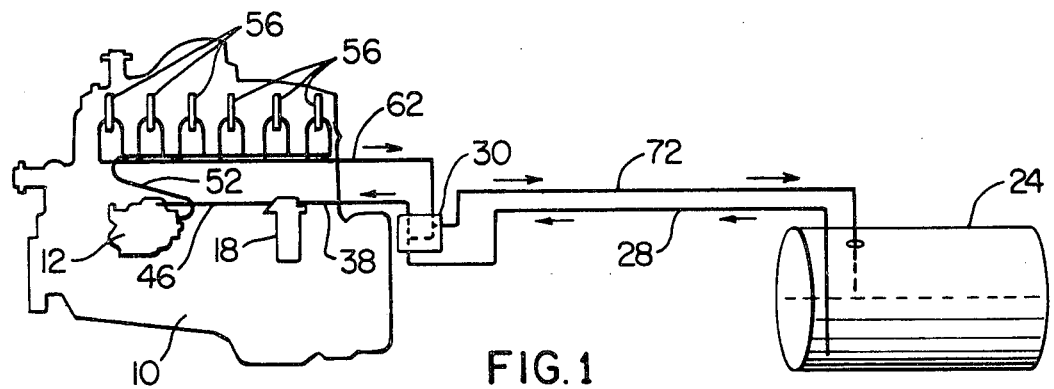
FIG. 1 is a diagrammatic view showing a diesel fuel control valve and system of this invention in combination with a diesel engine apparatus.

FIG. 1 shows a diesel engine 10 provided with a fuel pump 12 and a fuel filter 18. Diesel fuel is supplied to the engine 10 from a fuel tank 24.

A fuel supply conduit 28 extends from the tank 24 to a mixing control valve 30 of this invention. The fuel supply line 28 is joined to an inlet passage 34 within the mixing valve 30. A fuel supply conduit 38 is joined to an outlet passage 42 of the mixing control valve 30 and extends to the fuel filter 18. A conduit 46 extends from the fuel filter 18 to the fuel pump 12, and a conduit 52 extends from the fuel pump 12 to a set of fuel injectors 56 of the engine 10. A conduit 62 leads from the fuel injectors 56 to an inlet passage 66 of the mixing control valve 30. A fuel return conduit 72 is joined to an outlet passage 76 of the mixing control valve 30 and is also joined to the fuel tank 24.

Between the inlet passage 34 and the outlet passage 42 within the mixing control valve 30 is a main passage 80 which is in communication with the inlet passage 34 and the outlet passage 42. Within the main passage 80 is a thermally responsive actuator device 84 which is provided with a container 84a and a stem 84b. The thermally responsive actuator device 84 is preferably of a type, such as that shown in U.S. Pat. Nos. 2,806,375 and 2,806,376, having the stem 84b extending into the container 84a and having a quantity of thermally responsive expansible-contractible material within the container 84a. The thermally responsive material within the container 84a expands significantly in volume when subjected to temperatures above a given predetermined value. Such expansion causes relative movement between the container 84a and the stem 84b. The stem 84b is threadedly adjustably attached to a wall 88 of the mixing control valve 30. Therefore, the position of the container 84a with respect to the connecting passage 96 is adjustable by threaded movement of the stem 84b. Encompassing the container 84a is a spring 90 which engages the container 84a and also engages an annular seal member 92 which is positioned within an auxiliary passage 94. The auxiliary passage 94 is in communication with a connecting passage 96. The connecting passage 96 is provided with a valve seat 98 which is within a port 99. The port 99 is in communication with a chamber 100. The chamber 100 is in communication with the inlet passage 66 and the outlet passage 76.

Within the chamber 100 is a float member or buoyant member 104 which has a closure element 106 at least partially within the port 99.

Operation

The fuel pump 12 creates negative pressure conditions which cause fuel to flow from the tank 24, through the fuel supply conduit 28, and into the main passage 80 of the mixing control valve 30, through the inlet passage 34 thereof. The fuel then flows through the main passage 80 and outwardly from the mixing control valve 30 through the outlet passage 42. The fuel then flows through the fuel supply conduit 38 through the fuel filter 18, through the conduit 46 to the fuel pump 12, and flows from the fuel pump 12 through the conduit 52 to the fuel injectors 56 of the diesel engine 10. Some of the fuel provides combustion in the diesel engine 10 and some of the fuel flows from the injectors 56 through the conduit 62 to the mixing control valve 30 and into the inlet passage 66 thereof. The fuel then flows into the chamber 100. This fuel has been heated by the diesel engine 10 and has no crystallized wax therein but has entrained gases therein.

The closure element 106 of the float 104 engages the valve seat 98 and closes the port 99 until there is a sufficient volume of fuel within the chamber 100 to cause the float 104 to rise within the chamber 100. Therefore, entrained gases flowing from the engine 10 through the conduit 62 are not permitted to flow into the connecting passage 96. The entrained gases are forced to flow outwardly from the chamber 100, through the outlet passage 76 and then flow to the fuel tank 24 through the fuel return conduit 72. The gases are then vented from the tank 24 through any suitable vent means, not shown.

Figure 2:
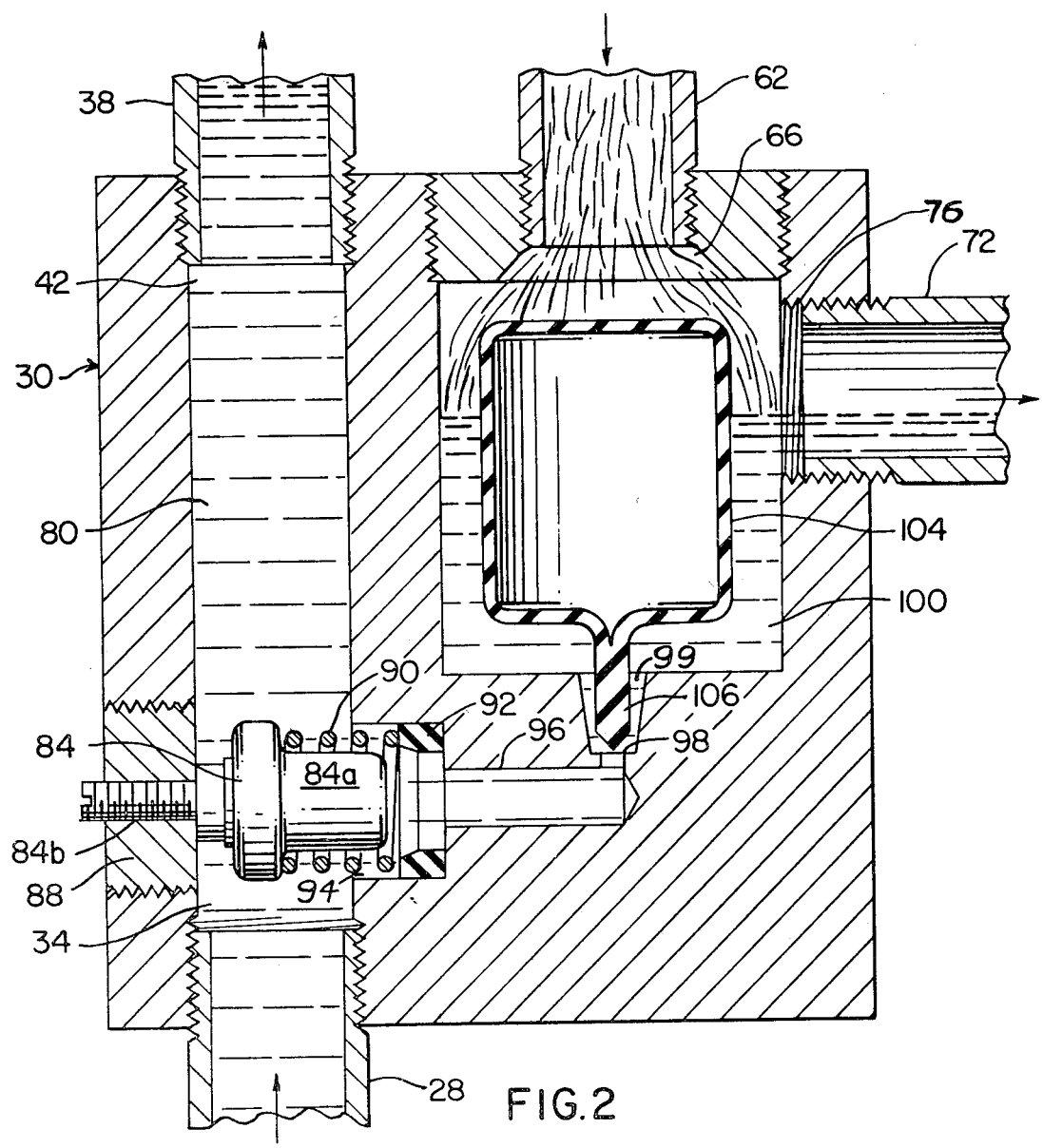
FIG. 2 is a cross-sectional diagrammatic type of view, drawn on a much larger scale than FIG. 1, showing a diesel fuel control valve of this invention in one of the operating modes thereof.

When the float 104 rises in the fuel within the chamber 100 as illustrated in FIG. 2, the closure element 106 is spaced from the valve seat 98. Therefore, heated fuel flows from the chamber 100 through the port 99, through the connecting passage 96 and into the main passage 80. This heated fuel is mixed with fuel flowing into the main passage 80 from the fuel tank 24.

Thus, as operation of the diesel engine 10 is initiated, heated fuel from the engine 10 is mixed with fuel flowing from the tank 24. Therefore, fuel flowing through the filter 18 to the engine 10, has a temperature sufficiently high that there is no crystallization of the wax, and clogging of the filter 18 does not occur.

This mixing action continues until the temperature of the fuel engaging the thermally responsive actuator 84 reaches a predetermined value. When this occurs, the container 84a moves in a direction from the stem 84b and toward the connecting passage 96. Thus, the volume of the fuel flowing from the chamber 100 to the main passage 80 is gradually reduced, and the portion of the fuel flowing from the tank 24 into the main passage 80 gradually increases. If the temperature of the fuel engaging the thermally responsive actuator 84 increases to a higher predetermined value, (a temperature at which wax crystallization is precluded) the container 84a moves into a position to close the connecting passage 96, and no fuel flows from the chamber 100 into the main passage 80. Thus, under these conditions all of the fuel flowing through the main passage 80 to the fuel filter 18 and to the engine 10 is fuel flowing directly from the tank 24.

When the temperatures to which the thermally responsive actuator device 84 is subjected are reduced to a predetermined value, the thermally responsive material within the container 84a reduces in volume, and the spring 90 forces the container 84a to move toward the wall 88. Thus, the connecting passage 96 is partially or entirely opened for flow of fuel therethrough to the main passage 80, and mixing of heated fuel with fuel from the tank 24 is resumed.

Thus, it is understood that the diesel fuel control valve and system of this invention provides fuel which has a sufficient temperature to avoid waxing and clogging of the fuel filter 18. Furthermore, the control valve of this invention effectively limits the temperature of fuel flow to the diesel engine, and does not permit flow of gas to the engine.

Although the preferred embodiment of the diesel fuel control valve and system of this invention has been described, it will be understood that within the purview of this invention various changes may be made in the form, details, proportion and arrangement of parts, the combination thereof, and the mode of operation, which generally stated consist in a diesel fuel control valve and system within the scope of the appended claims.

The invention having thus been described, the following is claimed:

1. A compact fuel control valve device adapted for use in a diesel engine fuel supply system including a fuel supply tank, a fuel supply conduit extending from the tank to the diesel engine, and a heated fuel and air conduit extending from the engine to the fuel supply tank for conducting from the engine a mixture of heated fuel and air entrained in the heated fuel, said fuel control valve device comprising a valve body defining a valve chamber having an upper portion and a lower portion, said valve body defining a fuel supply passage extending through said valve body and being connected to the fuel supply conduit for directing fuel from the supply tank through said fuel supply passage to the diesel engine, said valve body further defining a fuel recirculating passage connecting said lower portion of said valve chamber to said fuel supply passage, an annular valve seat surrounding said fuel recirculating passage, a buoyant valve member disposed for generally vertical movement within said valve chamber, a closure element connected to said valve member and positioned adjacent said valve seat for controlling the flow of heated fuel from said valve chamber through said recirculating passage into said fuel supply passage in response to vertical movement of said valve member within said valve chamber, said heated fuel and air conduit being connected to said upper portion of said valve chamber directly above said valve member, the cross-sectional area of said valve chamber being sufficiently small relative to the cross-sectional area of said heated fuel and air conduit to provide for directing all of the mixture of heated fuel and entrained air downwardly within said valve chamber directly upon and around said valve member while the diesel engine is operating, said valve member being positioned to receive and sense the mixture of heated fuel and entrained air flowing downwardly around said valve member such that said valve member responds to the proportions of heated fuel and air within the mixture while air separates from the mixture for conduction to the fuel supply tank by said heated fuel and air conduit, a thermally responsive valve unit positioned within said valve body at the junction of said fuel supply passage and said fuel recirculating passage, and said valve unit including means for controlling the flow of heated fuel through said recirculating passage in response to the temperature of the fuel flowing through said fuel supply passage, to provide a compact valve system for efficiently using the return fuel heated by the engine and adapted to require relatively small space adjacent the engine.

2. A fuel control valve device as defined in claim 1 wherein said valve body includes means defining a recessed port extending downwardly from said valve chamber and forming part of said recirculating passage, said valve seat being disposed at the bottom of said port, and said closure element projects downwardly from said buoyant valve member into said port to aid in controlling the flow of heated fuel through said recirculating passage in response to movement of said valve member.

3. A fuel control valve device as defined in claim 1 wherein said valve body defines two threaded holes extending from said upper portion of said valve chamber for receiving the heated fuel and air conduit.

4. A fuel control valve device as defined in claim 1 wherein said thermally responsive valve unit has a portion movable into and out of said fuel recirculating passage to control the flow of heated fuel through said fuel recirculating passage.

5. A fuel control valve device as defined in claim 1 wherein said thermally responsive valve unit includes a stationary stem attached to said valve body and a rigid container into which said stem extends, and said container being movable with respect to said stem into and out of said fuel recirculating passage to control the flow of heated fuel through said fuel recirculating passage.

6. A fuel control valve device as defined in claim 1 wherein said thermally responsive valve unit includes a stationary stem attached to said valve body and a rigid container into which said stem extends, said container being movable with respect to said stem into and out of said fuel recirculating passage to control flow of heated fuel through the said fuel recirculating passage, an annular seal member positioned within said fuel recirculating passage and receiving said rigid container to close said fuel recirculating passage.

* * * * *